United States Patent
Jurik et al.

(10) Patent No.: US 6,170,873 B1
(45) Date of Patent: Jan. 9, 2001

(54) STEERING COLUMN MOUNTING BRACKET WITH PULL LOOPS

(75) Inventors: Mirjana Jurik, Rochester Hills; Rodney L. Eaton, Clarkston, both of MI (US); Kurt E. Hofmeister, Holland, OH (US); Scott D. Laney; David S. Miller, both of Toledo, OH (US)

(73) Assignee: DaimlerChrysler Corporation, Auburn Hills, MI (US)

( * ) Notice: Under 35 U.S.C. 154(b), the term of this patent shall be extended for 0 days.

(21) Appl. No.: 09/281,104

(22) Filed: Mar. 29, 1999

(51) Int. Cl.$^7$ ........................................................ B62D 1/18
(52) U.S. Cl. .............................. 280/777; 74/492; 188/371
(58) Field of Search ........................... 280/777; 188/371; 74/492

(56) References Cited

U.S. PATENT DOCUMENTS

| | | |
|---|---|---|
| 4,786,076 | 11/1988 | Wierschem . |
| 4,838,576 * | 6/1989 | Hamasaki et al. .................. 280/777 |
| 4,886,295 * | 12/1989 | Browne ................................ 280/777 |
| 4,943,028 | 7/1990 | Hoffmann et al. . |
| 4,989,898 | 2/1991 | Yamaguchi et al. . |
| 5,052,716 * | 10/1991 | Matsumoto ......................... 280/777 |
| 5,082,311 | 1/1992 | Melotik . |
| 5,320,384 | 6/1994 | Arnold et al. . |
| 5,356,179 | 10/1994 | Hildebrandt et al. . |
| 5,417,452 | 5/1995 | Khalifa et al. . |
| 5,470,107 | 11/1995 | Muntener et al. . |
| 5,547,221 * | 8/1996 | Tomaru et al. ..................... 280/777 |
| 5,626,364 * | 5/1997 | Nakamura ........................... 280/777 |
| 5,775,172 * | 7/1998 | Fevre et al. ........................... 74/492 |

* cited by examiner

Primary Examiner—Lanna Mai
Assistant Examiner—Hau Phan
(74) Attorney, Agent, or Firm—Lawrence J. Shurupoff

(57) ABSTRACT

Apparatus for supporting a steering column of an automotive vehicle includes a mounting bracket secured to the steering column. Upper fasteners rigidly secured to vehicle support structure extend through longitudinally extending upper slots in the mounting bracket. Lower fasteners rigidly secured to the vehicle support structure extend through longitudinally extending lower slots in the mounting bracket. The connection of the fasteners in the slots of the mounting bracket releases in response to longitudinal collapse of the steering column in a frontal impact. The vehicle support structure overlies the mounting bracket to resist upward displacement of the mounting bracket when the steering column collapses. Pull loop assemblies are associated with the lower fasteners. Each pull loop assembly includes a generally U-shaped strap of flexible, bendable material having a first leg connected to one of the lower fasteners. Each strap has a second leg which is unattached. Each strap has a return bent intermediate portion extending over a fixed support frame on the mounting bracket so that when the bracket collapses with the steering column, the straps will unwind around and be pulled over the fixed support frame and thereby resist such collapse and absorb energy.

1 Claim, 3 Drawing Sheets

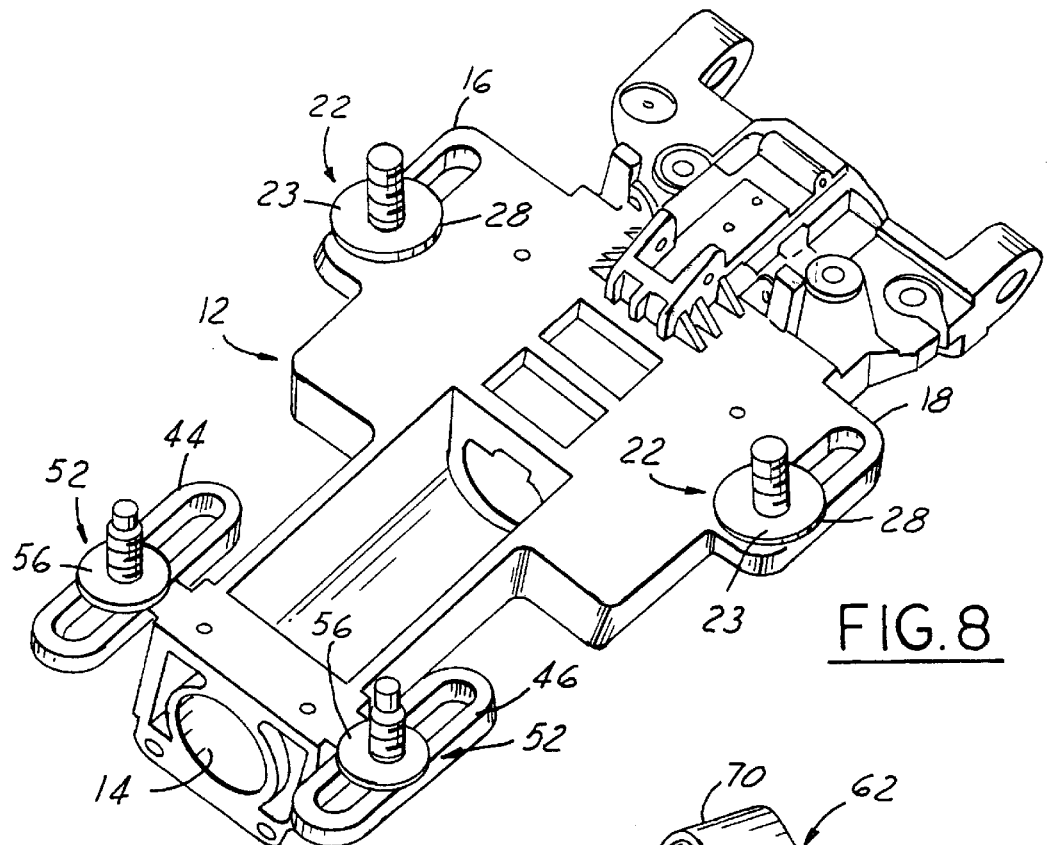
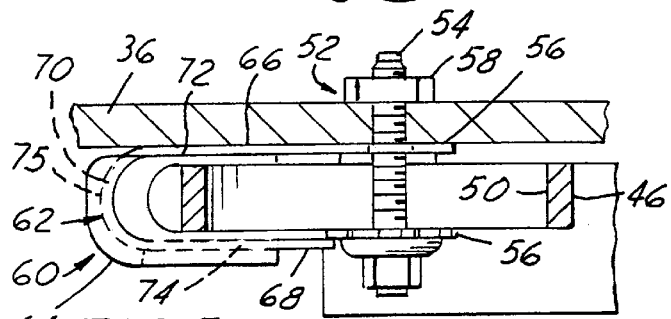
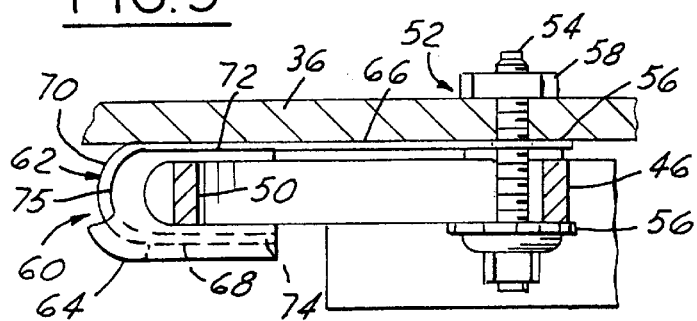
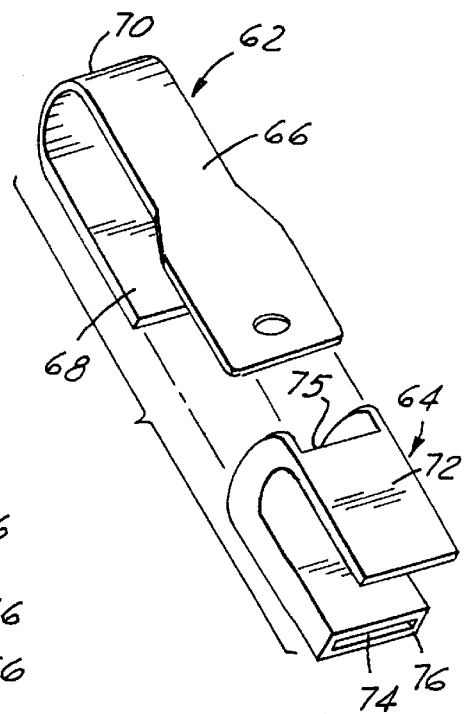

STEERING COLUMN MOUNTING BRACKET WITH PULL LOOPS

This invention relates generally to steering column support structure, and more particularly to support structure including a mounting bracket energy absorbing pull loops.

BACKGROUND AND SUMMARY OF THE INVENTION

When a crash or collision occurs, a driver can be thrown forward against the steering wheel with great impact.

It is desirable to provide a controlled collapse of the steering column to reduce the force of impact against the driver. The steering column will collapse, but it also tends to rise to a greater angle upon frontal impact, caused by the forward component of the force of the driver against the steering wheel. The rise of the steering column places the steering wheel/air bag assembly in an unfavorable position with respect to the driver. Accordingly, it is desirable not only to provide for a controlled collapse of the steering column, but also to prevent this tendency of the steering column to rise to a greater angle.

In accordance with the present invention, the steering column, which normally extends downwardly and forwardly from the steering wheel, is supported by a mounting bracket. The mounting bracket is secured to the steering column and to vehicle support structure. The connection to the vehicle support structure is releasable upon a frontal impact of sufficient severity, allowing the steering column to collapse in the direction of its length, that is, forwardly and downwardly.

More specifically, the mounting bracket is secured to the vehicle support structure by fasteners which extend through and are connected to longitudinal slots in the bracket. The connection of the fasteners in the slots is releasable in response to longitudinal collapse of the steering column in a frontal impact. There may be four such fasteners and two or more may be in the form of capsules.

Further in accordance with the invention, a pull loop assembly is associated with at least two of the fasteners. Each pull loop assembly includes an elongated, generally U-shaped strap of flexible, bendable, material having a first leg connected at one end to one of the fasteners and a second leg having an unattached or free end. Each strap has a return bent intermediate portion extending over a fixed part of the mounting bracket so that when the bracket collapses with the steering column the straps will unwind around and be pulled over the fixed part of the mounting bracket, absorbing energy in the process. Preferably the fixed part of the mounting bracket over which each strap extends is a separate support frame made of plastic or similar material fixedly attached to the mounting bracket.

The mounting bracket underlies certain vehicle support structure which prevents the bracket, and hence the steering column connected thereto, from rising. Accordingly, the steering column is guided in its collapsed configuration, but is also prevented from rising.

One object of this invention is to provide support structure for a steering column of a motor vehicle having the foregoing features and capabilities.

Other objects, features and advantages of the invention will become more apparent as the following description proceeds, especially when considered with the accompanying drawings.

BRIEF DESCRIPTION OF THE DRAWINGS

FIG. 5 is an enlarged fragmentary view with parts in section showing one of the fasteners and the associated pull loop assembly prior to collapse of the steering column.

FIG. 6 is a view similar to FIG. 5 showing the fastener and pull loop assembly after collapse of the steering column.

FIG. 7 is a perspective view showing one of the straps of a pull loop assembly, and a supporting frame for the strap.

FIG. 8 is a perspective view similar to FIG. 2 but showing a modification.

DETAILED DESCRIPTION OF THE PREFERRED EMBODIMENTS

Figure 1:
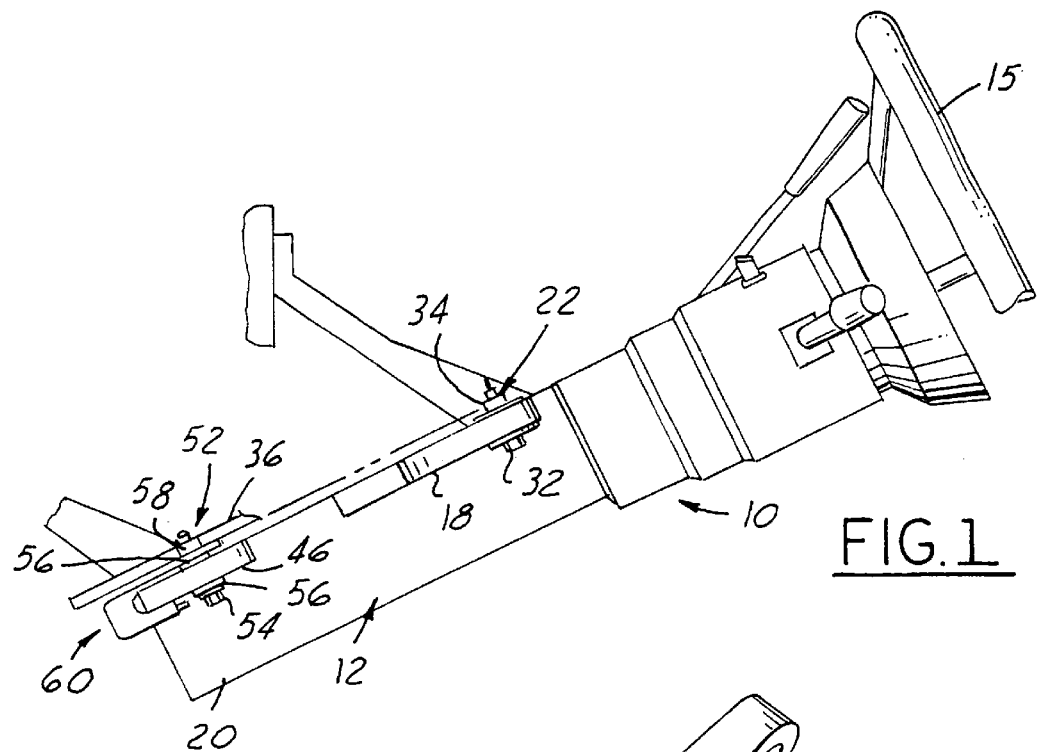
FIG. 1 is a side elevational view of a steering column supported by a mounting bracket, the mounting bracket being connected to vehicle support structure by fasteners, with a pull loop assembly associated with at least some of the fasteners, in accordance with the present invention.

Referring now more particularly to the drawings, an elongated steering column 10 extends in a downward and forward direction and is rigidly secured to a mounting bracket 12 so that the bracket becomes, in effect, a rigid part of the steering column. The mounting bracket has a central passage 14 through which the steering shaft (not shown) of the steering column extends. A steering wheel 15 is mounted on the upper end of the steering shaft.

The mounting bracket 12 has laterally spaced apart upper wing portions 16 and 18 extending laterally outwardly, and a downwardly extending lower end portion 20. Each of the wing portions 16, 18 has a longitudinally extending slot 21. The slots are closed at both ends. A fastener 22 is provided for each wing portion 16, 18. Each fastener 22 includes a capsule 23 disposed in one of the slots.

Each capsule has a central body portion 24 provided with laterally spaced ribs 25 extending into notches 26 in opposite side walls of the associated slot to anchor the capsule in the forward end of the slot. The capsules are preferably made of a suitable plastic material such that the ribs 25 will shear when and if the steering column collapses along its longitudinal axis in response to a substantial frontal impact so that the capsules will release and the upper mounting bracket can move with the steering column.

The capsules have circular rims 28 extending radially outwardly from opposite ends of the body portion 24. The rims 28 span the slots and frictionally engage the upper and lower surfaces of the wing portions 16, 18. The capsules have central passages through which a bolt 32 extends.

A nut 34 is threaded on each bolt 32 for rigidly securing the mounting bracket 12 to vehicle support structure 36. The fasteners 22 maintain the rims 28 in firm frictional engagement with the wing portions 16 and 18. This friction is overcome when the steering column collapses in the event of a frontal impact of sufficient magnitude.

Lower wing portions 44 and 46 project laterally outwardly from the lower end portion 20 of the bracket 12. Each of the wing portions 44, 46 has a longitudinally extending slot 50 similar to the slots 21 in the upper wing portions 16, 18. Fasteners 52 include bolts 54 which extend through the respective slots, with washers 56 above and below the lower wing portions 44, 46 to span the slots therein, such bolts being secured to the vehicle support structure by nuts 58 threaded on the upper ends thereof. This is a simple bolted construction in which the washers 56 are compressed in frictional engagement with the upper and lower surfaces of the lower wing portions 44 and 46.

The washers 56 on the bolts 54 are clamped tightly against the upper and lower surfaces of the lower wing portions of the bracket to frictionally resist movement of the bracket in a longitudinal direction. However, in the event of a steering column collapse as when a substantial frontal impact occurs, the friction is overcome and the fasteners 52 release the lower wing portions of the mounting brackets so that the mounting bracket can move with the steering column. If desired, the fasteners 52 could be replaced by fasteners similar to the fasteners 22 associated with the upper wing portions 16, 18, in other words, fasteners having capsules.

A pull loop assembly 60 is associated with each of the fasteners 52 (FIGS. 5–7). Each pull loop assembly 60 includes an elongated, generally U-shaped strap 62 and a strap-supporting fixed part which may be an integral portion of the mounting bracket 12 or, in this instance, a separate part in the form of a support frame 64 of plastic or the like affixed to the bracket. The strap 62 is formed from a length of flat, flexible, bendable material, preferably resilient metal, having an upper leg 66 and a lower leg 68 spaced from and substantially parallel to the upper leg. The bolt 54 extends through the end portion of the upper leg 66 of the strap. The end of the lower leg 68 is free and unattached. Each strap has a return bent intermediate portion 70 semi-cylindrical in form extending over the frame 64. The support frame 64 has laterally spaced apart upper and lower flat surfaces 72 and 74 which are parallel to one another, one surface 72 being in substantial contact with the upper leg 66 of the strap and the other surface 74 being in substantial contact with the lower leg 68 of the strap. Each frame 64 also has a semi-cylindrical portion 75 confronting the semi-cylindrical return bent intermediate portion 70 of the strap, over which the strap can slide. The lower leg 68 of each strap extends through a slot 76 in the support frame 64, one side of the slot being provided by the surface 74 of the support frame. The lower leg 68 of the strap is slidably received in the slot 76.

In the event of a frontal impact, the upper leg 66 of the strap remains affixed to the bolt 54 of the fastener 52 which itself is anchored to the rigid vehicle support structure so that as the mounting bracket moves with the collapsing steering column, the strap will unwind around and be pulled over the semi-cylindrical surface portion 75 of the support frame 64 to resist the collapse of the steering column and absorb energy, thereby reducing the force of impact on the driver against the steering wheel. The overlying support structure 36 guides the collapse of the steering column and prevents it from rising.

The legs of each strap extend at a predetermined angle to one another which is preferably approximately 0, and this angular relationship of the legs of the strap is maintained during unwinding of the straps. The means for maintaining this predetermined angle includes the slot 76 in the support frame 64 in which the lower leg 68 of the strap is slidably received.

Figure 2:
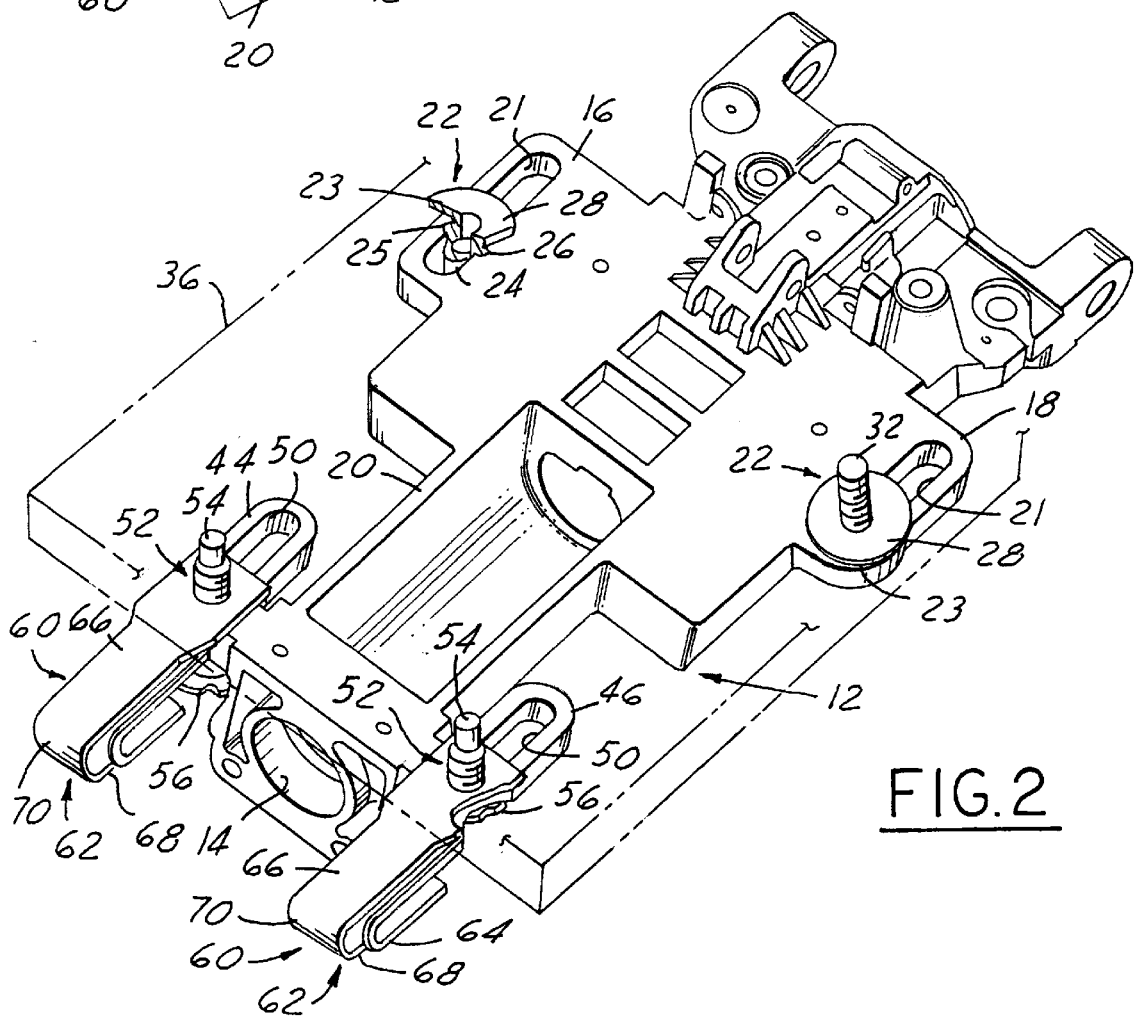
FIG. 2 is a perspective view of the mounting bracket, the fasteners and pull loop assemblies.
Figure 3:
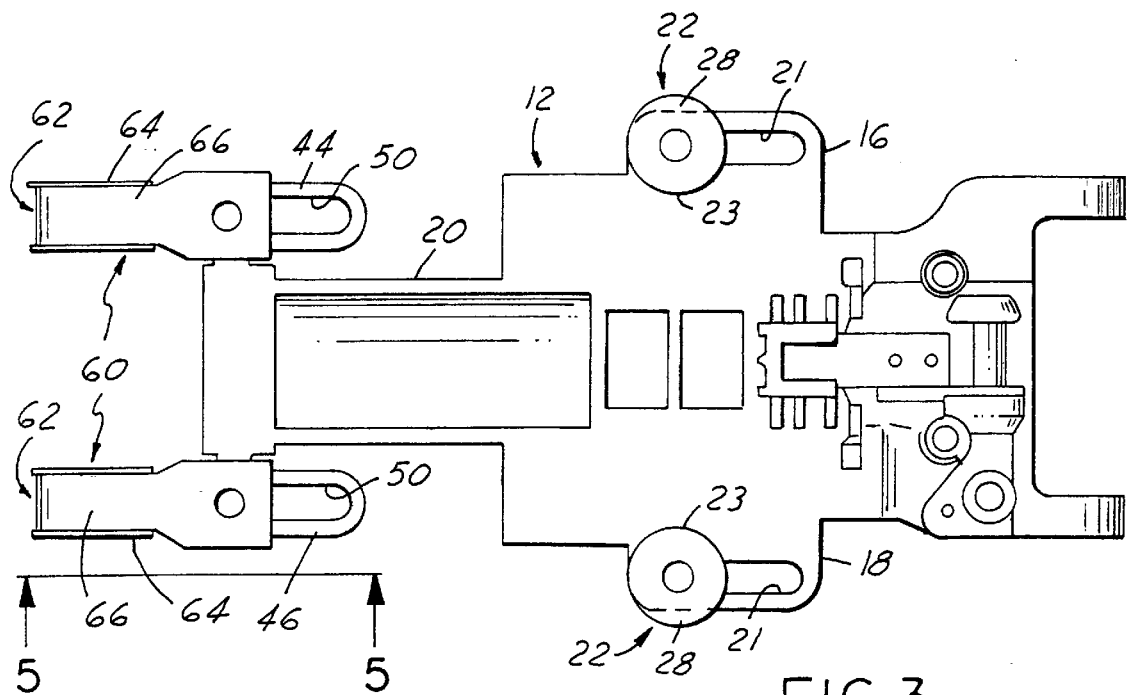
FIG. 3 is a top plan view of the structure shown in FIG. 2 prior to collapse of the steering column and attached mounting bracket.
Figure 4:
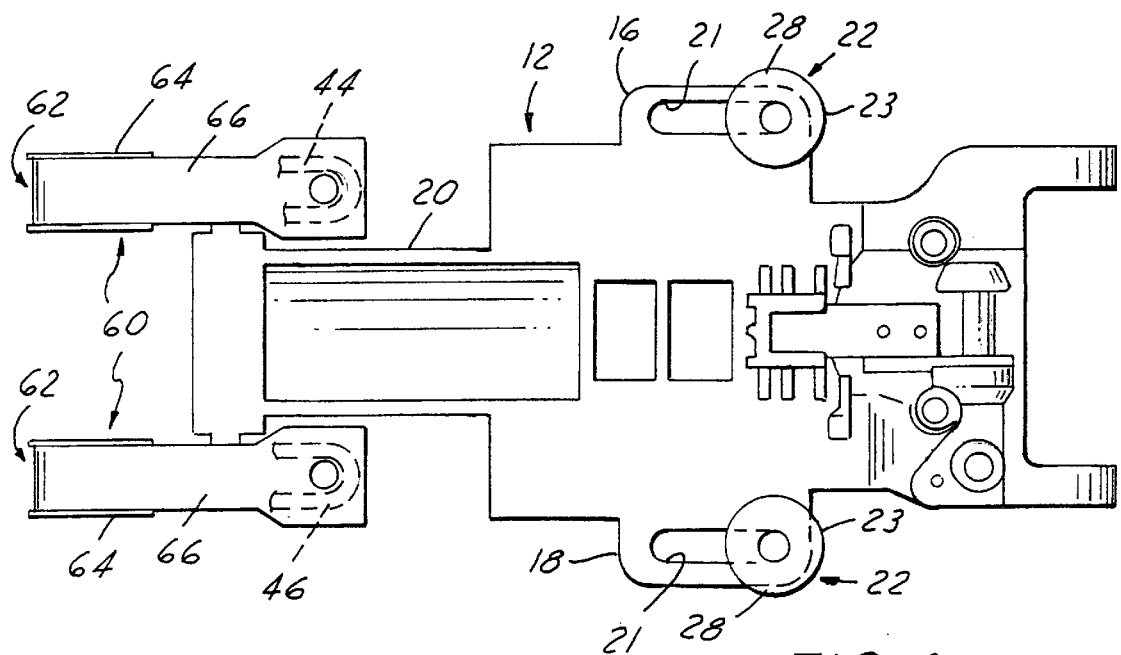
FIG. 4 is a view similar to FIG. 3 showing the parts after collapse.

FIG. 8 discloses a modification in which the construction of the mounting bracket 12 is the same but in which the pull loop assemblies are omitted. The fasteners 22 including capsules 23 for securing the upper wing portions 16, 18 of the bracket to the vehicle support structure, and the fasteners 52 for securing the lower wing portions 44, 46 of the bracket to the vehicle support structure are the same as disclosed in the first embodiment of FIGS. 1–7. Since the rims 28 of the capsules are frictionally engaged with the upper and lower surfaces of the upper wing portions 16 and 18, and since the washers 56 are frictionally engaged with the upper and lower surfaces of the lower wing portions 44 and 46, the fasteners resist longitudinal collapse of the mounting bracket and hence of the steering column, but in a frontal impact of sufficient magnitude this resistance is overcome and there will be a controlled collapse of the steering column and absorption of energy.

What is claimed is:

1. Apparatus for supporting an elongated steering column of an automotive vehicle in a position extending in a downward and forward direction with respect to the vehicle comprising, rigid vehicle support structure, a mounting bracket secured to the steering column, means connecting an upper portion of said mounting bracket to a first portion of said rigid vehicle support structure, said means comprising laterally spaced upper fasteners rigidly secured to said first portion of said vehicle support structure and extending through and connected to longitudinally extending upper slots in said upper portion of said mounting bracket, each of said upper fasteners including a capsule having a body portion provided with laterally spaced ribs extending into notches in opposite side walls of the associated upper slot to releasably anchor the capsule in a forward end portion of the associated upper slot, means connecting a lower portion of said mounting bracket to a second portion of said vehicle support structure comprising laterally spaced lower fasteners rigidly secured to said second portion of said vehicle support structure and extending through and connected to longitudinally extending lower slots in said lower portion of said mounting bracket, the connection of said upper fasteners to said upper slots and said lower fasteners to said lower slots being releasable in response to longitudinal collapse of the steering column in a frontal impact so that said mounting bracket is capable of collapsing with the steering column in said downward and forward direction, a pull loop assembly associated with each of said lower fasteners, each of said pull loop assemblies including an elongated, generally U-shaped strap of flexible, bendable material having a first leg connected at a first end thereof to one of said lower fasteners and a second leg spaced from the first leg thereof having an unattached free end, each of said straps having a return bent intermediate portion extending over a fixed part of said mounting bracket in sliding engagement therewith whereby when the bracket collapses with the steering column in a frontal impact the straps will unwind around and be pulled over the fixed part of the mounting bracket and thereby resist such collapse and absorb energy, said rigid vehicle support structure having a further portion which overlies said mounting bracket to resist upward displacement of said mounting bracket while permitting said mounting bracket to collapse with the steering column in said downward and forward direction.

* * * * *